United States Patent
Merrill et al.

(10) Patent No.: US 7,387,758 B2
(45) Date of Patent: Jun. 17, 2008

(54) TABBED CERAMIC ARTICLE FOR IMPROVED INTERLAMINAR STRENGTH

(75) Inventors: Gary B. Merrill, Orlando, FL (US); Jay A. Morrison, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 248 days.

(21) Appl. No.: 11/059,221

(22) Filed: Feb. 16, 2005

(65) Prior Publication Data

US 2006/0182971 A1    Aug. 17, 2006

(51) Int. Cl.
*B28B 23/02* (2006.01)
*B32B 5/06* (2006.01)
*B32B 5/12* (2006.01)

(52) U.S. Cl. ............... 264/257; 264/265; 264/274; 28/112; 156/148; 427/289; 427/299; 428/133; 428/293.4

(58) Field of Classification Search ............... None
See application file for complete search history.

(56) References Cited

U.S. PATENT DOCUMENTS

| | | | | |
|---|---|---|---|---|
| 2,564,497 A | * | 8/1951 | Navias | 431/356 |
| 2,734,007 A | * | 2/1956 | Toulmin, Jr. | 428/161 |
| 2,970,365 A | * | 2/1961 | Morgenstern | 428/219 |
| 3,008,256 A | * | 11/1961 | Rice | 156/63 |
| 3,068,016 A | | 12/1962 | Dega | |
| 3,451,885 A | * | 6/1969 | Klein | 442/225 |
| 3,487,530 A | | 1/1970 | Ely | |
| 3,506,529 A | * | 4/1970 | Sanders | 428/92 |
| 3,511,740 A | * | 5/1970 | Sanders | 428/92 |
| 3,627,861 A | * | 12/1971 | Timke | 264/680 |
| 3,856,602 A | * | 12/1974 | Colijn et al. | 156/148 |
| 4,075,364 A | | 2/1978 | Panzera | |
| 4,141,127 A | | 2/1979 | Cretella et al. | |
| 4,141,681 A | * | 2/1979 | Lovatt | 432/258 |
| 4,251,239 A | * | 2/1981 | Clyde et al. | 96/67 |
| 4,289,447 A | | 9/1981 | Sterman et al. | |
| 4,405,284 A | | 9/1983 | Albrecht et al. | |
| 4,466,151 A | * | 8/1984 | Barch et al. | 15/229.13 |
| 4,504,218 A | * | 3/1985 | Mihara et al. | 431/326 |
| 4,639,388 A | | 1/1987 | Ainsworth et al. | |
| 4,713,275 A | * | 12/1987 | Riccitiello et al. | 428/76 |
| 4,776,071 A | * | 10/1988 | Yoshizawa | 226/190 |

(Continued)

FOREIGN PATENT DOCUMENTS

EP    0062860    * 10/1982

(Continued)

*Primary Examiner*—John J Zimmerman

(57) ABSTRACT

A ceramic article having improved interlaminar strength and a method of forming the article. The article may be a ceramic matrix composite article. The methods of forming the articles increase the interlaminar strength of the article by forming indentations in the article during processing. The indentations may be tabs that are formed such that they provide one or more beneficial features for ceramic articles, such as CMC articles and hybrid structures. The tabs may be any of a variety of shapes, orientations, spacings, and combinations. In an alternative embodiment, the indentations are formed by pulling one or more fibers from one side of the ceramic layer to the other side. The articles have increased surface area, which helps to increase the bonding strength between the ceramic layer and any thermal barrier coating layer and/or ceramic core in the ceramic article.

10 Claims, 3 Drawing Sheets

U.S. PATENT DOCUMENTS

| | | | |
|---|---|---|---|
| 4,790,052 A * | 12/1988 | Olry | 28/110 |
| 5,185,924 A | 2/1993 | Fraser | |
| 5,190,611 A | 3/1993 | Cologna et al. | |
| 5,203,059 A * | 4/1993 | Olry et al. | 28/107 |
| 5,226,217 A * | 7/1993 | Olry et al. | 28/107 |
| 5,331,816 A * | 7/1994 | Able et al. | 60/753 |
| 5,553,455 A * | 9/1996 | Craig et al. | 60/753 |
| 6,051,313 A * | 4/2000 | Olry et al. | 428/371 |
| 6,129,967 A | 10/2000 | Young et al. | |
| 6,228,786 B1 * | 5/2001 | Olry et al. | 442/205 |
| 6,312,791 B1 | 11/2001 | Fasano et al. | |
| 6,485,791 B1 * | 11/2002 | Nagaraj | 427/452 |
| 6,561,757 B2 | 5/2003 | Burdgick et al. | |
| 6,568,050 B2 * | 5/2003 | Duval | 28/107 |
| 6,575,738 B1 | 6/2003 | Nguyen et al. | |
| 6,615,470 B2 | 9/2003 | Cordeman et al. | |
| 6,787,195 B2 * | 9/2004 | Wang et al. | 427/452 |
| 7,033,537 B2 * | 4/2006 | Shoji et al. | 264/653 |
| 2002/0168505 A1 * | 11/2002 | Morrison et al. | 428/293.1 |
| 2003/0185674 A1 * | 10/2003 | Alford et al. | 415/173.1 |
| 2003/0223861 A1 | 12/2003 | Morrison et al. | |
| 2004/0115395 A1 * | 6/2004 | Cairo et al. | 428/131 |
| 2004/0247845 A1 * | 12/2004 | Abe et al. | 428/223 |
| 2005/0271505 A1 * | 12/2005 | Alford et al. | 415/173.1 |
| 2006/0120874 A1 * | 6/2006 | Burke et al. | 416/229 R |
| 2006/0134488 A1 * | 6/2006 | Cortright et al. | 429/30 |
| 2006/0147631 A1 * | 7/2006 | Lev et al. | 427/290 |
| 2007/0020105 A1 * | 1/2007 | Albrecht et al. | 416/224 |

FOREIGN PATENT DOCUMENTS

JP  8-325908  * 12/1996

* cited by examiner

TABBED CERAMIC ARTICLE FOR IMPROVED INTERLAMINAR STRENGTH

FIELD OF THE INVENTION

This invention is directed generally to the formation of ceramic articles, and more particularly to forming ceramic matrix composite articles.

BACKGROUND

Ceramic materials generally have excellent hardness, heat resistance, abrasion resistance, and corrosion resistance, and are therefore beneficial for high temperature machine applications such as gas turbines and the like. However, ceramic materials are easily fractured by tensile stresses and exhibit a high degree of brittleness. To improve upon the fracture toughness of a ceramic material, it is known to provide a ceramic matrix composite (CMC) material wherein a plurality of inorganic or metal fibers is disposed in a matrix of ceramic material. The fibers provide tensile strength and toughness to augment the other beneficial properties of the ceramic material. A CMC material may be formed by impregnating a preform of fiber-containing fabric material with ceramic material powder using a known wet method such as slip casting or slurry infiltration. The cast or laid-up part is then dried using low pressures and temperatures to form a green body. The green body is then sintered by known techniques such as atmospheric-pressure sintering or reaction sintering to sinter the matrix to its final density to form the ceramic matrix composite material.

One of the limitations in the application of ceramic matrix composite materials to combustion turbine applications is the available interlaminar shear and tensile strength of the composite (which in many cases represents only 2-3% of the in-plane strength). For many such applications, the predicted interlaminar stresses exceed the design allowable limits for commercially available materials. Methods for improving these properties are therefore needed.

One possibility for improving the interlaminar tensile strength of a CMC material is matrix densification. Current oxide CMC's are made using a one-step matrix processing which yields a high level of porosity. This porosity gives the composite maximum in-plane strength, strain tolerance and notch insensitivity. Increasing matrix density by additional infiltration steps would improve the matrix-dominated properties (interlaminar shear and tension) of the composite. However, increased matrix density has been shown to dramatically decrease the in-plane properties and would result in a more brittle failure mode for the material.

Another way to improve the interlaminar tensile strength of a CMC material is to incorporate a fiber coating. For non-oxide CMC's, a weak interface coating on the fiber has been shown to improve load distribution from the matrix to the fibers and to yield a tough, high strength composite. Weak fiber/matrix interface coatings have been developed for oxide-based CMC's (monazites, germinates, etc.), however, their benefits have yet to be demonstrated for this class of material.

A third approach to improved interlaminar strength is fiber reinforcement. The use of inorganic whiskers and fibers to reinforce glasses, glass-ceramics, and ceramics has long been practiced. The mechanism of strengthening of glass or ceramic bodies by fibers is considered to be that of load transfer by the matrix to the fibers through shear. This load transfer shifts stress from the glass or ceramic matrix to the relatively long, high modulus fibers, while the fibers at the same time may act to impede crack propagation in the matrix material. For continuous fiber reinforcement, such as 3D weaves, braids, knits, and the like, effective infiltration methods have not been developed, particularly for slurry-based matrix systems. Such process development is time-consuming, expensive, and risky. Therefore, new methods of through-thickness strengthening are needed.

Among the fibers and whiskers which have been suggested for use as reinforcement for non-metal matrix materials are silicon carbide, silicon nitride, alumina, and carbon whiskers. For example, U.S. Pat. No. 4,324,843 describes SiC fiber reinforced glass-ceramic composite bodies wherein the glass-ceramic matrix is of aluminosilicate composition. U.S. Pat. No. 4,464,475 describes similarly reinforced glass-ceramics comprising barium osumilite as the predominant crystal phase, while U.S. Pat. No. 4,464,192 describes whisker-reinforced glass-ceramic composites of aluminosilicate composition.

A principal objective of whisker reinforcement in glass, ceramic and glass-ceramic materials for high temperature applications is that of increasing the toughness of the material. A toughened ceramic material exhibits improved resistance to cracking failure from flaws sustained in use, offering the possibility of increased fatigue lifetime. As noted in U.S. Pat. No. 4,626,515, the addition of fiber reinforcement to glasses such as alkali-free alkaline earth aluminosilicate glasses may result in substantial strengthening, while whisker additions to those glasses were found effective to enhance the toughness of the glass. Introduction of whiskers to a slurry-based process (such as typically used for oxide-ased CMCs) is impractical, since high-aspect ratio members would inhibit the optimal particle packing required for these materials.

Many of the fiber-reinforced composites described in the prior art are of laminar type, i.e., the fiber reinforcement is disposed in layers within the material, with the layers consisting of fiber groups or arrays wherein the fibers within each layer are principally disposed in substantially parallel alignment in a single direction, termed the fiber direction of the layer. Each such layer may be characterized as unidirectional in that the fibers in the layer will all be oriented in substantially the same axial direction [or in 2 principle/orthogonal directions, such as with fabric laminates].

Ceramic matrix composites to be utilized in high-stress, high-temperature environments, will beneficially exhibit not only high bending strength and fracture toughness, but also through-thickness strength properties which are >>2% of the in-plane properties of the composite material. The attainment of such properties in laminar systems normally requires at least some cross-ply lamination of fiber reinforced laminae in the material since, as has been observed, matrix densification and whiskers alone cannot impart the necessary high isotropic flexural strength to the material.

Accordingly what is needed is a ceramic article having improved interlaminar strength. Also what is needed is a method of improving the interlaminar strength of ceramic articles. Also what is needed is a method of arresting crack development in ceramic articles.

SUMMARY OF THE INVENTION

This present invention provides a tabbed ceramic article having improved interlaminar strength and a method of forming the same. The article may be a ceramic matrix composite article. The methods of the present invention increase the interlaminar strength of a ceramic article by forming indentations in the article during processing. The indentations may be tabs that are formed such that they protrude either inward (away from the hot gas path) or outward (toward the hot gas path) to provide one or more beneficial features for ceramic articles, such as CMC articles and hybrid structures. The tabs may be any of a variety of shapes, orientations, spacings, and combinations. In an alternative embodiment, the indentations are formed by pulling one or more fibers from one side of the ceramic layer to the other side. The articles of the present invention have increased surface area, which helps to increase the bonding strength between the ceramic layer and any thermal barrier coating layer and/or ceramic core in the ceramic article.

These and other embodiments are described in more detail below.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

This present invention provides tabbed ceramic articles having improved interlaminar strength. The articles may be a ceramic matrix composite (CMC) articles. CMC structures for gas turbines are generally limited by their low interlaminar strength, which is a result of having planar regions of unreinforced matrix between fiber-reinforced layers. In addition, hybrid CMCs (having a friable gradient insulator (FGI) thermal protection coating) are often limited by the strength of the FGI-to-CMC bond joint. This bond joint is also typically low in strength due to the planar nature of the joint and the inherent weakness of the bond material.

The present invention provides a method of increasing the interlaminar strength of a ceramic article by forming tabs in the article during processing. The tabs may be formed such that they protrude either inward (away from the hot gas path) or outward (toward the hot gas path) to provide one or more beneficial features for ceramic articles, such as CMC articles and hybrid structures.

Figure 1:
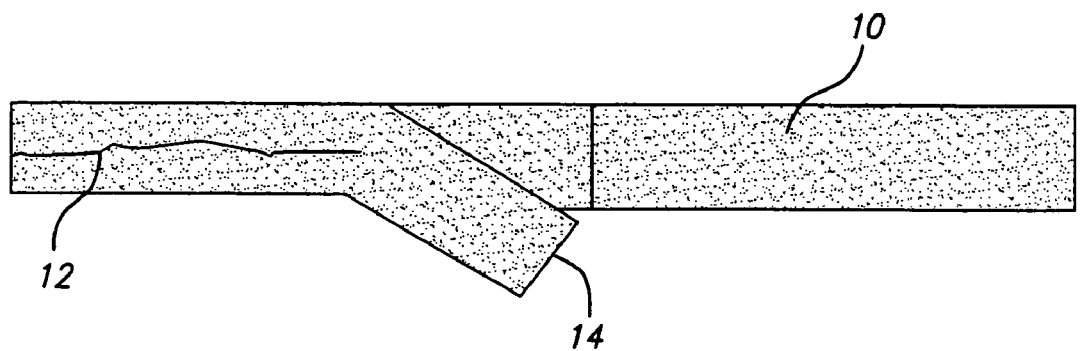
FIG. 1 shows an example of crack formation in a ceramic layer and arresting crack formation using a tab according to one aspect of the present invention.

In one aspect, as seen in FIG. 1, the methods of the present invention provide tabs in a ceramic article 10 such that the tabs help to provide interlaminar reinforcement, which provides a crack arrest mechanism in the ceramic article. In many instances, during use, a ceramic article 10 may develop cracks 12 in the ceramic layers of a CMC or related hybrid structure. Left unchecked, these cracks 12 may eventually run the length of the ceramic layers. Nevertheless, as shown in FIG. 1, by forming the ceramic article 10 having tabs 14, the break in the ceramic layer 10 helps arrest crack 12 development by causing the crack to stop as it approaches the tab 14. Interlaminar crack arrest is achieved through the out-of-plane orientation of the tab features.

Figure 2:
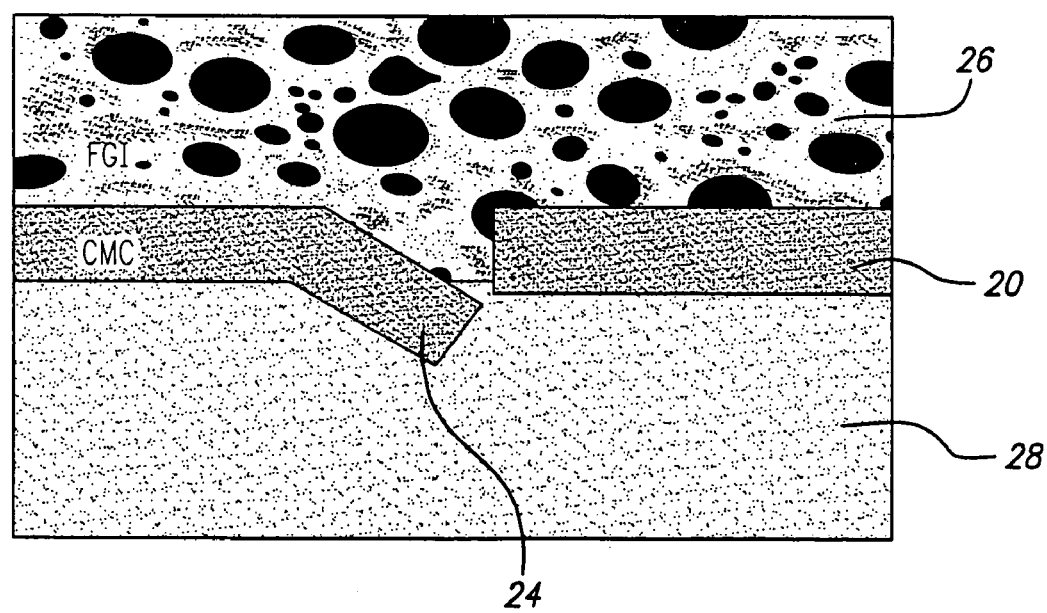
FIG. 2 shows an example of increasing surface area between a ceramic layer and any thermal barrier coating and/or core layer to increase interlaminar strength and/or reinforced bond joints, according to another aspect of the present invention.

In another aspect, as seen in FIG. 2, the methods of the present invention provide tabs 24 in a ceramic article such that the tabs 24 help to provide interlaminar reinforcement, which provides increased bond area for any thermal protection coating, such as an FGI layer 26. In addition, the tabs would increase the bond area for any ceramic core material layer 28 disposed below the ceramic layer 20. As the interlaminar regions are no longer strictly planar, there is an increased higher interlaminar strength in the ceramic article. The FGI and/or core materials, when they are cast onto the pre-fabricated CMC (either bisque-fired or fully fired state), penetrate and/or conform to the irregular CMC surface, thereby providing the increased bond area, which provides the interlaminar reinforcement.

In another aspect, as may also be seen in FIG. 2, the methods of the present invention provide tabs 24 in a ceramic article such that the tabs 24 help to provide interlaminar reinforcement, which results in reinforced bond joints with any thermal protection coating, such as an FGI layer 26. In addition, the tabs would result in reinforced bond joints with any ceramic core material layer 28 disposed below the ceramic layer 20. The tabs 24 result in improved bonding between the ceramic layer 20 and the FGI layer 26 and/or the ceramic layer 20 and the core 28 by providing non-planar bond joints, increased bond surface area, and/or mechanical interlocking features.

Figure 3:
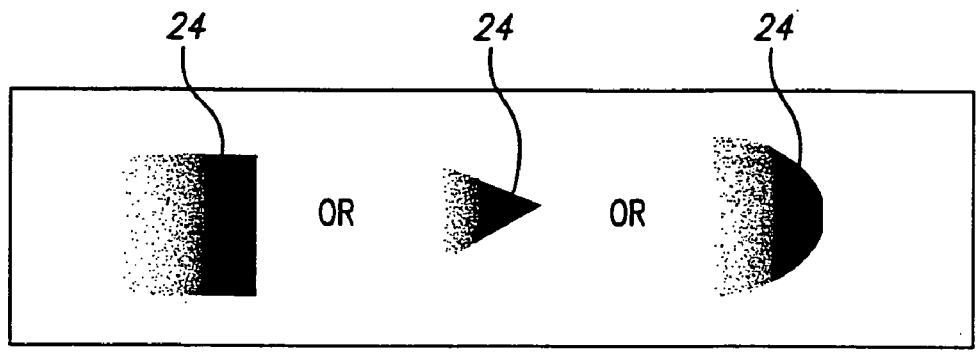
FIG. 3 shows examples of shapes of tabs according to various embodiments of the present invention.

The tabs may be formed during the formation of the ceramic article using any mechanism capable of forming a tab in a ceramic material. In one embodiment, the tabs are formed via hard tooling, such as through a tool punch. The tabs may be any size. In one embodiment, the tabs are sized between about 2 to about 10 mm in-plane. The tabs may, in one embodiment, be sized such that they protrude from the surface from about 1 to about 5 mm. The tabs may be any of a variety of shapes, orientations, spacings, and combinations. In alternative embodiments, the tabs may be clustered or concentrated within one or more areas of the article, thereby modifying the properties in these localized areas. In yet another alternative embodiment, the orientations may be alternated such that one tab protrudes upward while another tab protrudes downward. This may be done to provide additional interlocking with the ceramic layer and any thermal barrier coating layer and/or core layer. Examples of possible tab shapes may be seen in FIG. 3.

Figure 4:
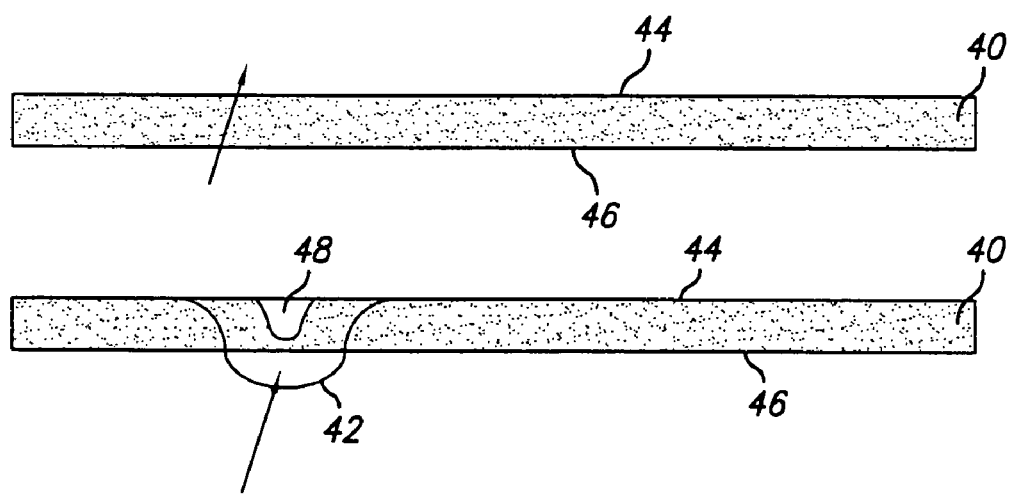
FIG. 4 shows another embodiment of increasing the interlaminar strength of a ceramic matrix composite according to the present invention.

In an alternative embodiment, one or more of the beneficial aspects of the tabs may be accomplished using individual fibers or tows. As seen in FIG. 4, the individual fibers or tows 42 may be pulled through the thickness of the ceramic layer lay-up while the layer 40, such as a CMC, is still in its wet state. After some or all of the fabric layers of a CMC lay-up 40 have been laid, a tool may be used to penetrate the CMC lay-up from one side 44, grab one or more fibers 42 on the opposite surface 46, and pull them through the lay-up 40. This would create an indentation 48 on one face 44 of the lay-up and a protrusion of fibers 42 on the opposite face 46. The fibers 42 may be left intact or cut to have free ends which could provide additional reinforcement for any bonding coatings and/or core materials (not shown) to the CMC. The indentation 48 on the other side 44 of the lay-up 42 may provide additional surface area for any bonding coatings and/or core materials (not shown) to the CMC. In addition to any benefits for the bonds, the fibers 42 passing through the CMC may also provide interlaminar and/or in-plane shear reinforcement.

Figure 5A:
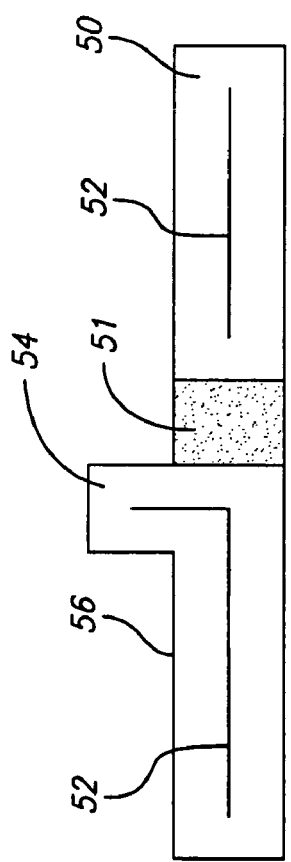
FIGS. 5A-5C show yet another embodiment of the present invention wherein a tab may formed and then pressed into the surface.
Figure 5B:
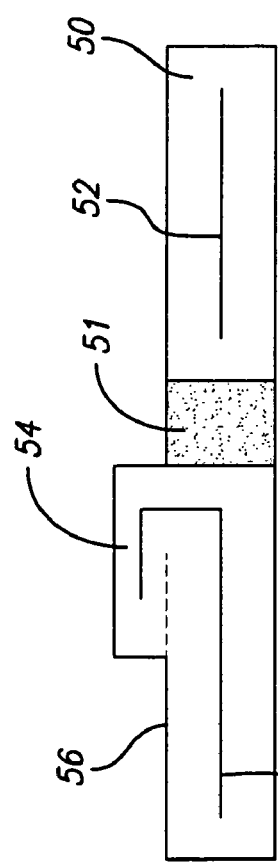
Figure 5C:
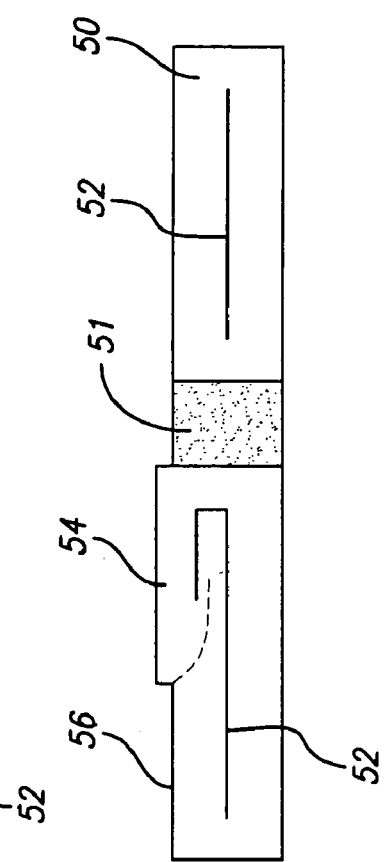

In yet another embodiment of the present invention, the ceramic articles of the present invention may utilize tabs that are formed as normal, but then are wrapped around the article and pressed back into the article, thereby providing the advantages of tab formation, but while eliminating protrusions that may not be beneficial based upon the selected use of the ceramic article. As shown in FIGS. 5A-5C, this embodiment may begin with a ceramic article 50 having a fiber 52. A tab 54 is formed in the article 50, leaving a void area that may be filled by an FGI or a solid core, as previously discussed. As shown in FIG. 5B, the tab 54 may be folded or wrapped-around the article 50 and compressed into one side 56 of the article 50. Doing this effectively loops the fibers 52 around 180 degrees. Then, as shown in FIG. 5C, a tool or other mechanism may be used to compress the tab 54 into the surface 56 of the article 50 such that the tab 54 is flat or substantially flat as compared to the surface 56 of the article 50. Not only does this help smooth the surface 56 of the article 50, pressing the tab 54 into the surface 56 also increases fiber volume fraction and local density.

The present invention may be used to form a variety of ceramic and CMC articles. In one embodiment, these articles are airfoils that may be used in a turbine engine. In other embodiments, the article may be selected from combustor tiles, combustor liners, ducts, airfoil platforms, ring segments or blade tip seals.

Although particularly beneficial to slurry-based oxide CMC laminates, the present invention is not limited to any composition or processing method and is equally suitable for oxide and non-oxide materials and processes.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of forming a ceramic article comprising the steps of:
   forming a ceramic article having at least one ceramic layer; and
   forming at least one indentation in the ceramic layer to increase a surface area of the ceramic layer;
   wherein the ceramic article is a ceramic matrix composite article; and
   wherein the indentation is formed by pulling at least one fiber in the ceramic matrix composite through a thickness of the ceramic layer while the ceramic layer is in a wet state, thereby creating an indentation on one side of the ceramic layer.

2. The method of claim 1, further comprising the step of casting a thermal barrier coating layer onto a first side of the at least one ceramic matrix composite layer.

3. The method of claim 2, further comprising the step of casting a ceramic core layer onto a side opposite to the first side of the at least one ceramic matrix composite layer.

4. The method of claim 1, further comprising the step of casting a ceramic core layer onto a side of the at least one ceramic matrix composite layer.

5. The method of claim 1, wherein the ceramic article is a ceramic matrix composite article.

6. The method of claim 1, wherein the indentation comprises a tab.

7. The method of claim 6, wherein the ceramic article is a ceramic matrix composite article.

8. The method of claim 6, further comprising casting a thermal barrier coating layer onto a first side of the ceramic matrix composite layer wherein the tab increases the surface area between the at least one ceramic matrix composite layer and the thermal barrier coating layer.

9. The method of claim 8, further comprising casting a ceramic core layer onto a side of the at least one ceramic matrix composite layer opposite to the first side, wherein the tab increases the surface area between the at least one ceramic matrix composite layer and the ceramic core layer.

10. The method of claim 6, further comprising the step of casting a ceramic core layer onto a first side of the at least one ceramic matrix composite layer wherein the tab increases the surface area between the at least one ceramic matrix composite layer and the ceramic core layer.

* * * * *